(12) United States Patent
Gogna et al.

(10) Patent No.: US 11,042,153 B2
(45) Date of Patent: Jun. 22, 2021

(54) ADAPTIVE MULTI-NETWORK VEHICLE ARCHITECTURE

(71) Applicant: Zoox, Inc., Foster City, CA (US)

(72) Inventors: Ravi Gogna, San Jose, CA (US); Paul Orecchio, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 136 days.

(21) Appl. No.: 16/230,966

(22) Filed: Dec. 21, 2018

(65) Prior Publication Data

US 2020/0201315 A1    Jun. 25, 2020

(51) Int. Cl.
| | | |
|---|---|---|
| *G05D 1/00* | (2006.01) |
| *H04B 17/309* | (2015.01) |
| *G05D 1/02* | (2020.01) |
| *H04W 24/08* | (2009.01) |
| *H04W 4/40* | (2018.01) |
| *H04W 84/18* | (2009.01) |

(52) U.S. Cl.
CPC ......... *G05D 1/0022* (2013.01); *G05D 1/0088* (2013.01); *G05D 1/0212* (2013.01); *H04B 17/309* (2015.01); *H04W 4/40* (2018.02); *H04W 24/08* (2013.01); *H04W 84/18* (2013.01); *G05D 2201/02* (2013.01)

(58) Field of Classification Search
CPC .. G05D 1/0022; G05D 1/0088; G05D 1/0212; G05D 2201/02; H04B 17/309; H04W 4/40; H04W 24/08; H04W 84/18
See application file for complete search history.

(56) References Cited

U.S. PATENT DOCUMENTS

| | | | | |
|---|---|---|---|---|
| 2010/0142395 A1* | 6/2010 | Yasuie | ............... | H04L 43/0888 370/252 |
| 2017/0160742 A1* | 6/2017 | Ross | .................... | G05D 1/0274 |
| 2018/0139585 A1* | 5/2018 | Gholmieh | ............ | H04L 65/608 |
| 2018/0257643 A1* | 9/2018 | Kroop | .................. | B60W 10/20 |
| 2018/0259974 A1 | 9/2018 | Lei et al. | | |
| 2020/0041995 A1* | 2/2020 | Quillin | ................. | G05D 1/0038 |

FOREIGN PATENT DOCUMENTS

| | | |
|---|---|---|
| EP | 3387864 A1 | 6/2017 |
| WO | WO2018089883 A1 | 5/2018 |

OTHER PUBLICATIONS

Search Report and Written Opinion dated Feb. 26, 2020, for PCT Application No. PCT/US2019/067174, 14 pages.

* cited by examiner

*Primary Examiner* — Anne Marie Antonucci
*Assistant Examiner* — Sahar Motazedi
(74) *Attorney, Agent, or Firm* — Lee & Hayes, P.C.

(57) ABSTRACT

A vehicle can connect to multiple networks and can determine network parameters (e.g., available bandwidth, latency, signal strength, etc.) associated with the multiple networks. Additionally, the vehicle can access network map data associated with the multiple networks. As the vehicle traverses an environment, the vehicle can collect sensor data of the environment and/or vehicle data (e.g., vehicle pose, diagnostic data, etc.). Based on the network parameters and the network map data, the vehicle can optimize the use of the networks determine portions of the sensor data and/or vehicle data to transmit via the one or more of the multiple networks.

20 Claims, 6 Drawing Sheets

ADAPTIVE MULTI-NETWORK VEHICLE ARCHITECTURE

BACKGROUND

A vehicle can connect to a network to transmit and receive data with a remote computing device. During operation of the vehicle, the network can experience congestion resulting in a reduced network performance. The reduced network performance can lead to suboptimal performance of the vehicle's communication with, for example, the remote computing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
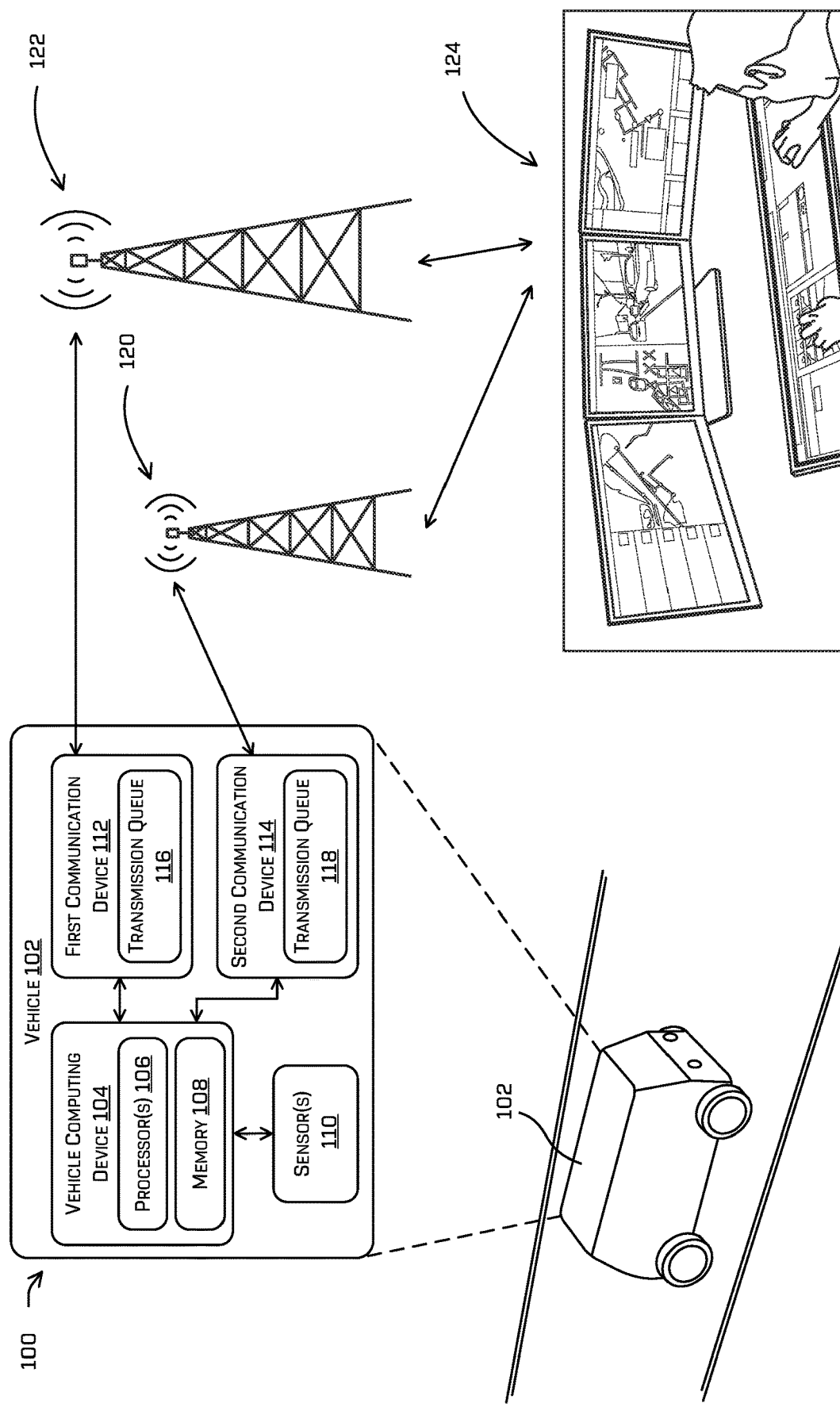
FIG. 1 depicts an example block diagram of a vehicle traversing through an environment while in communication with a remote computing device.

This disclosure describes systems, methods, and apparatuses for an adaptive multi-network architecture of a vehicle. For example, an autonomous vehicle can connect to multiple networks to transmit vehicle data captured and/or determined by the vehicle. The vehicle data can include sensor data captured by a sensor of the vehicle, diagnostic data of the vehicle, and/or trajectory data indicating a trajectory of the vehicle. Additionally, the vehicle can measure and/or determine network parameters (also referred to as network measurements, signal parameters, and/or network data) associated with the multiple networks at a current location as well as network parameters (or network measurements) associated with other locations (at a currently measured time and/or based on previous mapping). Based on the network parameters at the current location and/or the network parameters associated with other locations, the vehicle can determine portions of the vehicle data to transmit at various locations and/or times while traversing the trajectory. Using the network parameters, the vehicle can prioritize and/or optimize the transmission of the vehicle data and anticipate the availability of the multiple networks along the trajectory.

A vehicle can include multiple modems (also referred to as a communication device) capable of connecting to one or more networks. For example, a vehicle can include a first modem capable of connecting to a first wireless network and a second modem capable of connecting to a second wireless network. In some instances, the vehicle can include a single modem that can connect to both the first wireless network and the second wireless network. In some instances, the first wireless network and the second wireless network can be associated with the same wireless network provider or different wireless network providers. In some instances, having access to multiple networks associated with different wireless providers can reduce the probability of traversing through a location that does not provide network availability due to varying network coverage.

As the vehicle operates it can capture and/or determine data associated with the vehicle (also referred to as vehicle data). For example, the vehicle data can include vehicle status data, vehicle diagnostic data, and vehicle metrics data. The vehicle status data can indicate that the vehicle is an operating mode, a standby mode, and/or a fault mode, for example. The vehicle diagnostic data can indicate a battery status/charge data, vehicle log data (e.g., a data log including the operations that the vehicle has received and/or operations that the vehicle has executed), component statuses of individual components of the vehicle, and/or an occupancy of the vehicle, though any other diagnostic data is contemplated. The vehicle metrics data can include current and/or previous steering angle data and/or current and/or previous acceleration data.

In some instances, the vehicle data can include sensor data captured by one or more sensors where the sensor data is associated with an environment. The one or more sensors can include time-of-flight sensors, lidar sensors, radar sensors, sonar sensors, image sensors, audio sensors, infrared sensors, location sensors, etc., or any combination thereof, although other types of sensors are contemplated. The sensor data can be associated with objects such as buildings, trees, vehicles, pedestrians. In some instances, the sensor data can be associated with road markers and/or road signs.

Using the sensor data, the vehicle can, using a vehicle computing device, determine a trajectory for the vehicle to follow and safely navigate the environment. For example, the trajectory can include a path along streets and/or roads where the vehicle has determined that it is safe for the vehicle to travel along. In some instances, the vehicle can determine a trajectory that includes pulling the vehicle over onto a shoulder or a side of a road to avoid obstacles in the road.

As the vehicle traverses the environment, the vehicle can transmit or prepare to transmit some or all of the vehicle data. For example, the vehicle can transmit vehicle data such as location data to a remote computing device to enable tracking of the vehicle. In some instances, the vehicle can transmit vehicle data such as image data captured by an image sensor of the vehicle to the remote computing device to monitor the vehicle's perspective of the environment. Additionally, or alternatively, the vehicle can also receive location dependent data for driving, such as map data for traversing a section of an environment and/or commands from the remote computing device.

As discussed above, the vehicle can include multiple modems capable of connecting to one or more networks. As the vehicle traverses the environment, the vehicle can monitor network parameters associated with the networks. For example, the vehicle can monitor network parameters such as bandwidth data, signal strength data, frequency band data, latency data, jitter data, and/or error rate data, although other types of network parameters are contemplated. Based on the network parameters, the vehicle can prepare the vehicle data for transmission. For example, the network parameters can indicate that the vehicle can transmit at a data rate of 20 megabits per second (Mbps). In response, the vehicle can compress or select the vehicle data so that it does not exceed the 20 Mbps data rate or that the vehicle data saturates the 20 Mbps data rate.

In some instances, the vehicle computing device can determine portions of vehicle data and assign a priority level with the portions of the vehicle data based on the network parameters. For example, the vehicle computing device can associate a priority level for the vehicle data associated with the vehicle diagnostic data that is higher than a priority level associated with the image data. In some instances, the priority can be fixed based on the type of vehicle data such that a pose type of vehicle data always has a higher priority than a diagnostic type of vehicle data. In some instances, the priority can be dynamic based on the vehicle data and/or the network parameters. In some instances, the vehicle can have a default priority scheme associated with types of vehicle data and a dynamic priority scheme based on the vehicle data, the network parameters, and/or instructions from a remote computing device. In some examples, such prioritization may be context dependent. As a non-limiting example, during nominal operations of such a vehicle, the vehicle diagnostic data may have a higher priority over other data type. However, when engaging with a remote computing device for guidance, image data may take higher priority.

Based on the network parameters and/or priorities, the vehicle can prepare the vehicle data for transmission by preparing a first portion of the vehicle data to be transmitted over a first network and a second portion of the vehicle data to be transmitted over a second network. For example, the network parameters can indicate that the first network has more bandwidth available (or lower latency, higher signal strength, and the like) than the second network. In response, the vehicle computing device can determine to transmit vehicle data having a higher priority using the first network and determine to transmit vehicle data having a lower priority using the second network.

The vehicle can access network map data to determine network parameters associated with other locations different from the vehicle's current location. For example, the vehicle can, prior to traversing the environment, store the network map data at the vehicle computing device or in a storage accessible to the vehicle computing device. In some instances, the vehicle can receive the network map data as it traverses the environment and/or receive network map data updates as it traverses the environment. In some instances, the vehicle can transmit the measured network parameters to a remote computing device and the remote computing device can use the measured network parameters to update the network map data. Based on the network map data, the vehicle computing device can preemptively prepare the vehicle data for transmission. For example, the vehicle map data can indicate that an upcoming location along the vehicle's trajectory does not provide network availability. In response, the vehicle computing device can prepare to transmit more of the vehicle data prior to entering the location that does not have network availability. In a similar example, where connectivity of only one provider is degraded in an area, the vehicle computing device may bias data to be sent out on other networks. By way of another example, the vehicle computing device can downgrade a resolution of data to be sent or otherwise limit an amount of data to be transmitted prior to entering a location with reduced network performance. Additionally, in some instances, the vehicle computing device can continue to determine new vehicle data as it traverses the location without network availability and determine a priority level with portions of the new vehicle data so as to transmit the vehicle data associated with a higher priority level as soon as a network becomes available.

In some instances, the vehicle can receive guidance from the remote computing device. For example, the vehicle can transmit the vehicle data over the one or more networks to the remote computing device. As discussed above, the vehicle data can include location data and sensor data. In some instances, the vehicle can encounter an event that represents a safety concern and/or includes uncertainty. The vehicle can be configured to detect the safety concern and/or the uncertainty and transmit a request, in addition to the vehicle data, to the remote computing device. In some instances, the remote computing device can be associated with a teleoperator. The teleoperator can assess the situation and provide guidance to the vehicle. After receiving the guidance (and/or a command, in general), the vehicle can continue operation in order to achieve a safe outcome in response to the event.

Additionally, the techniques discussed herein can improve a functioning of a computing device by increasing the ability for the computing device to maintain a connection to one or more networks and/or improve the connection to the one or more networks. For example, a computing device associated with a vehicle can determine that a first network is unavailable but that a second network is available. Then, the computing device can transmit prioritized data using the second network to ensure an uninterrupted communication with a remote computing device. In some instances, the computing device can determine that a first network is associated with a lower latency and/or a higher bandwidth than the second network and can transmit data using the first network for higher priority data.

Therefore, the functioning of a computing device can be increased by increasing the computing device's ability to maintain a consistent connection and/or improving the data transfer performance of the computing device. As can be understood, maintaining and/or improving a network connection with a vehicle can improve safety outcomes and can improve ride quality by quickly resolving issues remotely, particularly in the context of autonomous vehicle. Thus, the techniques described herein can improve a functioning of a computing device as well as improve safety outcomes.

The techniques described herein can be implemented in a number of ways. Example implementations are provided below with reference to the following figures. Although discussed in the context of an autonomous vehicle, the techniques described herein can be applied to a variety of systems requiring determination and detection of objects, and is not limited to autonomous vehicles. In another example, the systems, methods, and apparatuses can be used in an aviation or in a nautical context. Additionally, the techniques described herein can be used with real data (e.g., captured using sensor(s)), simulated data (e.g., generated by a simulator), or any combination of the two.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 can be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power sources. Although the example vehicle 102 has four wheels, the systems and methods described herein can be incorporated into vehicles having fewer or a greater number of wheels, tires, and/or tracks. The example vehicle 102 can have four-wheel steering and can operate generally with equal or similar performance characteristics in all directions, for example, such that a first end of the vehicle 102 is the front end of the vehicle 102 when traveling in a first direction, and such that the first end becomes the rear end of the vehicle 102 when traveling in the opposite direction. Similarly, a second end of the vehicle 102 is the front end of the vehicle when traveling in the second direction, and such that the second end becomes the rear end of the vehicle 102 when traveling in the opposite direction. These example characteristics may facilitate greater maneuverability, for example, in small spaces or crowded environments, such as parking lots and/or urban areas.

As discussed above, the vehicle 102 can include a vehicle computing device 104. The vehicle computing device 104 can include one or more processors 106 and memory 108 communicatively coupled to the one or more processors 106. The one or more processors 106 can include, for example, one or more FPGAs, SoCs, ASICs, and/or CPUs. The vehicle 102 can be used to travel through the environment 100 and determine and/or capture data. For example, the vehicle computing device 104 can determine vehicle status data, vehicle diagnostic data, and/or vehicle metrics data. In some instances, the vehicle 102 can include one or more sensors 110 where the one or more sensors 110 can include one or more time-of-flight sensors, lidar sensors, radar sensors, sonar sensors, image sensors, audio sensors, infrared sensors, location sensors, wheel encoders, IMUs, etc., or any combination thereof, although other types of sensors are contemplated.

As the vehicle 102 travels through the environment 100, the sensors 110 can capture sensor data associated with the environment 100. For example, some of the sensor data can be associated with objects (e.g., trees, vehicles, and/or pedestrians). In some instances, the sensor data can be associated with other objects including, but not limited to, buildings, road surfaces, signage, barriers, etc. In some instances, the vehicle computing device 104 can determine information about objects in the environment, such as bounding boxes, classifications, segmentation information, and the like.

The vehicle computing device 104 can use the sensor data to generate a trajectory for the vehicle 102. In some instances, the vehicle computing device 104 can also determine pose data associated with a position of the vehicle 102. For example, the vehicle computing device 104 can use the sensor data to determine position data, coordinate data, and/or orientation data of the vehicle 102 in the environment 100. In some instances, the pose data can include x-y-z coordinates and/or can include pitch, roll, and yaw data associated with the vehicle 102.

The vehicle computing device 104 can be communicatively coupled to a first communication device 112 (also referred to as a first modem or a first communication connection) and a second communication device 114 (also referred to as a second modem or a second communication connection). The first communication device 112 can be associated with a first transmission queue 116 and the second communication device 114 can be associated with a second transmission queue 118. Using one or both of the first communication device 112 and the second communication device 114, the vehicle computing device 104 can connect to a first network and/or a second network via a first communication tower 120 and/or a second communication tower 122. For example, the first communication tower 120 can be associated with wireless frequency bands of a first network that are supported by the first communication device 112 and the second communication tower 122 can be associated with wireless frequency bands of a second network that are supported by the second communication device 114. Accordingly, this dual modem architecture can allow the vehicle computing device 104 to communicate using either of the first network or the second network.

In some instances, the first communication device 112 and the second communication device 114 can be substantially similar and can both connect to either the first network and/or the second network. In some instances, the first network and the second network can be associated with the same network provider and/or network operator. In some instances, the first network and the second network can be associated with different network providers and/or network operators.

As the vehicle 102 operates, it can transmit the vehicle data or a portion of the vehicle data to a remote computing device 124. For example, the vehicle can transmit vehicle data such as location data to the remote computing device 124 to enable tracking of the vehicle. In some instances, the remote computing device 124 can include a server that stores the location data in a database. In some instances, the remote computing device 124 can be operated by a person as depicted in FIG. 1. For example, while operating, the vehicle 102 can encounter an event that is unpredictable in nature, represents safety concerns, or requires responses to spontaneous visual cues or direction from, for example, police officers or construction workers. The vehicle 102 can be configured to detect that an uncertainty associated with an action (e.g., by determining confidence level(s) associated with a maneuver and/or event). Upon identifying such uncertainty, the vehicle 102 can send a request to a teleoperations device (e.g., the remote computing device 124) to obtain guidance to resolve the uncertainty and proceed.

Following the request to the teleoperations device, a user interface can quickly and accurately apprise the teleoperator of the situation. In some instances, the vehicle 102 can transmit vehicle data (e.g., sensor data captured by sensors 110 and/or operation state data) with the request. In response to the request, a teleoperator can provide guidance (which may sometimes be referred to as a command, or otherwise information, such as, but not limited to, disregard certain policies, a path to try and follow, or the like) to the vehicle 102. In some instances, the teleoperations device can determine the guidance based at least on the request, sensor data, and/or vehicle state data.

The remote computing device 124 can be configured to provide network map data to the vehicle 102. In some examples, such network map data may be tags, or otherwise additional information, associated with a map otherwise used for localization as described with respect to FIG. 3. As discussed above, the vehicle 102 can be configured to access network map data to determine network parameters associated with other locations different from the vehicle's current location. The remote computing device 124 can provide the network map data prior to the vehicle 102 operating in the environment 100 and/or be configured to provide network map updates as the vehicle 102 traverse the environment 100. In some instances, the vehicle 102 can measure and/or record network parameters determined by the vehicle as it traverses the environment 100 and transmit the measured network parameters to the remote computing device 124.

In some instances, the vehicle can use a parameter index (e.g., a time parameter, an event parameter, a location parameter, and/or a weather parameter) to select a portion of a network map (including network map data) or select a network map from a plurality of network maps (including network map data). For example, the vehicle can approach a location at 3 PM while connected to a first network associated with a first network provider and a second network associated with a second network provider. The vehicle can then access, for example, a database of network maps. The vehicle can use the network provider as a parameter index and access the network maps associated with the first network provider. Then, the vehicle can use the location as a parameter index and access the network maps associated with the first network provider at the location. Subsequently, the vehicle can use the time of day as 3 PM to access the network maps associated with the first network provider, at the location, and associated with the 3 PM time of day. The vehicle can then perform similar operations to access the network maps associated with the second network provider using similar or different parameter indices.

In some instances, the network map data can include weather data (e.g., various maps for one or more of seasons, rain, sleet, sunshine, snow, etc. which may impact network connectivity). In some instances, the network map data can include event data associating the network parameters with an event. For example, the network map data can indicate an available bandwidth at a particular location as 50 Mbps at a first time and an available bandwidth at the particular location as 5 Mbps at a second time where the second time coincided with a concert event. Regardless, a network map/network map data may be selected which corresponds to a time of day, location, weather, events, and the like (as may impact network connectivity).

Figure 2A:
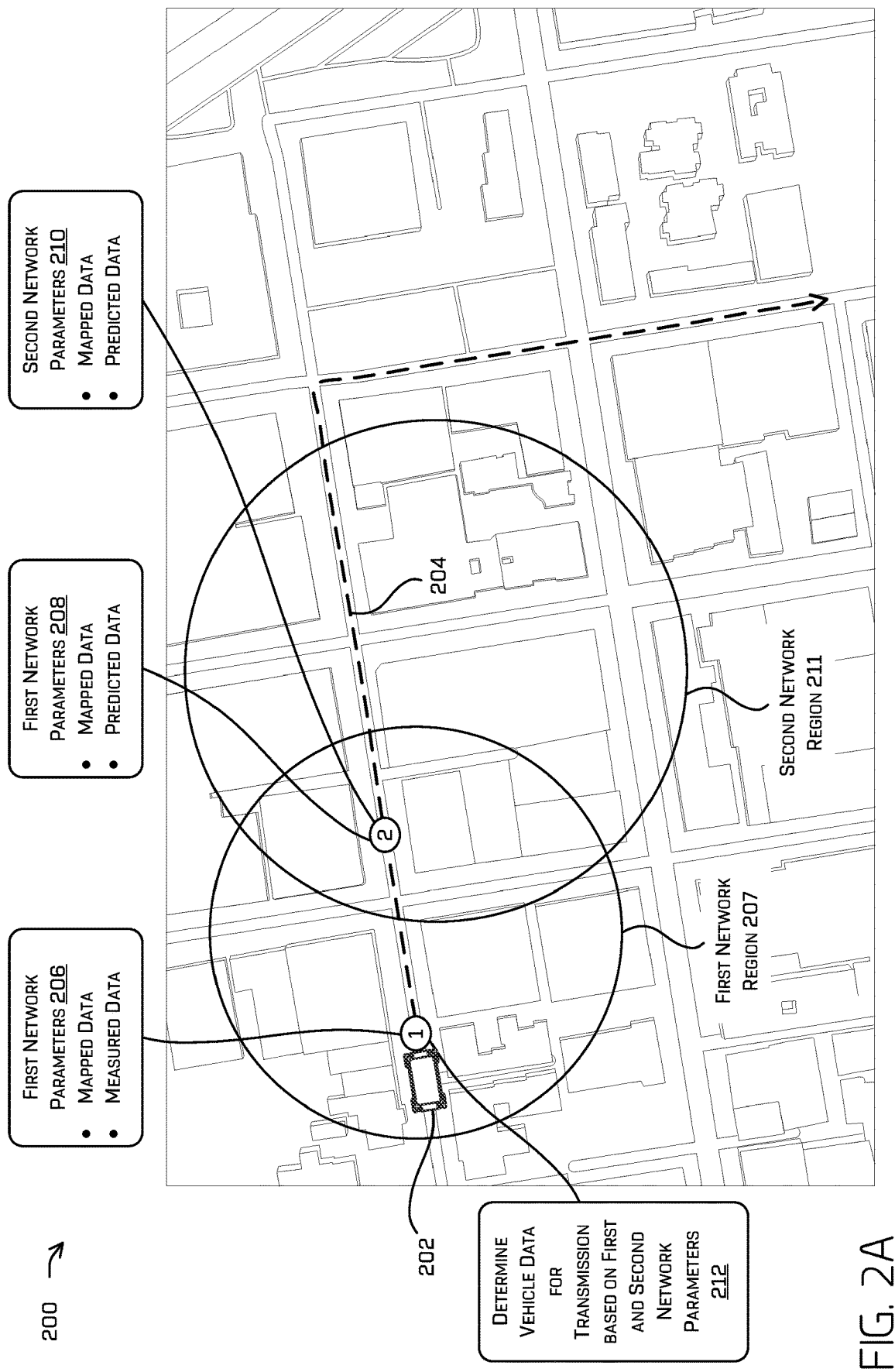
FIG. 2A depicts an example top view of an environment with a vehicle traversing an example trajectory.
Figure 2B:
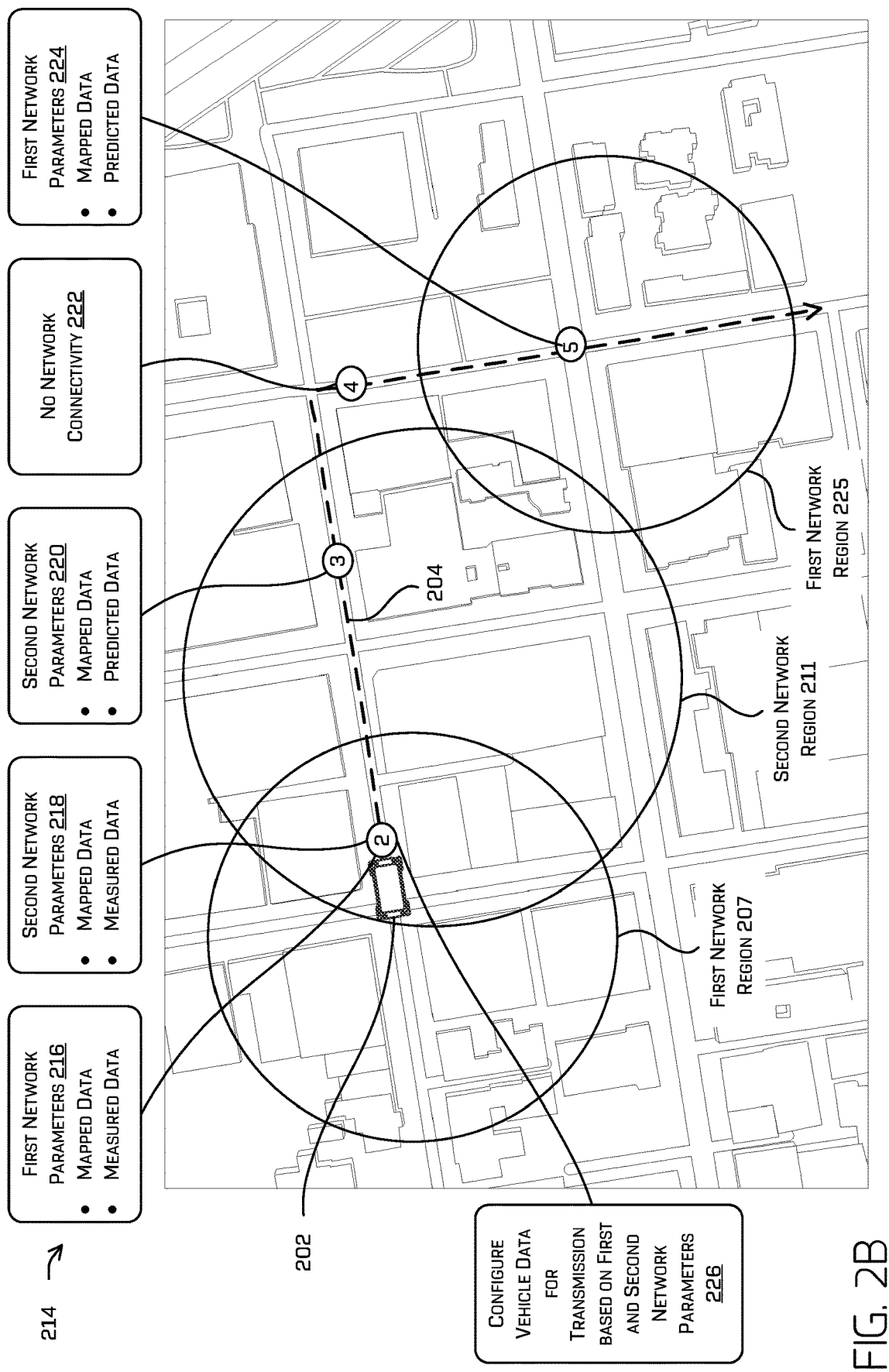
FIG. 2B depicts the example environment of FIG. 2A with locations identified along the example trajectory as the vehicle advances through the example trajectory.
Figure 2C:
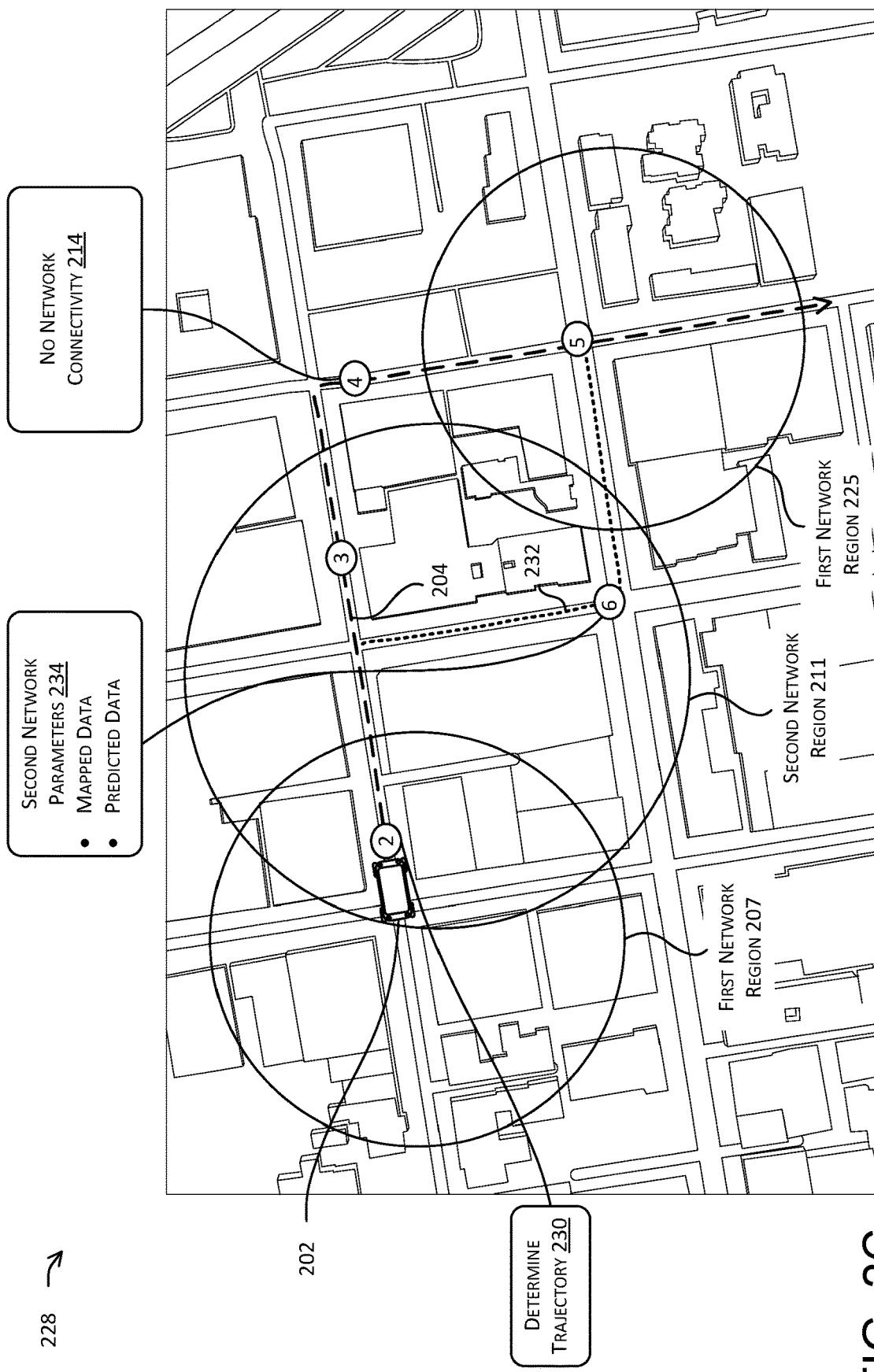
FIG. 2C depicts the example environment of FIG. 2B with an alternative trajectory.

FIG. 2A-2C illustrates an example environment with example operations executed by the vehicle computing device. Each operation can represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. For example, some figures include numbering such as ①, ②, ③, etc. This numbering is intended to orient a reader to one possible order of operations, but is not intended to be construed as a limitation, as discussed herein FIG. 2A illustrates an example environment 200 depicting a top view with a vehicle 202 traversing a trajectory 204. The vehicle 202 can be similar to the vehicle 102 described above with reference to FIG. 1. At location ①, the vehicle 202 can determine first network parameters 206 that are associated with a first network, where the first network provides network coverage within a first network region 207. In some instances, the network map data can indicate that the first network region 207 is associated with any amount of network coverage provided by the first network. In some instances, the network map data can indicate that the first network region 207 is associated with network parameters that meets or exceeds a threshold. For example, the network map data can indicate that the first network region 207 is associated with a bandwidth of 10 Mbps where the vehicle 202 determines a bandwidth threshold of 8 Mbps. In some instances, the first network region 207 can indicate a gradient of network coverage. For example, an outer portion of the first network region 207 can be associated with a lower signal strength (or bandwidth) while a center portion of the first network region 207 can be associated with a higher signal strength (or bandwidth). In some instances, the gradient can be linear or nonlinear. In some instances, the network parameters associated with different areas within the first network region 207 can be uniform and/or nonuniform.

As discussed above, the vehicle 202 can access network map data indicating network parameters associated with one or more networks at various locations of the environment 200 to determine the mapped data. To determine the measured data, the vehicle 202 can be configured to use communication devices (or modems) to measure network parameters at a current location of the vehicle 202.

In some instances, the network parameters can include bandwidth data, signal strength (or field strength) data, frequency band data, time data, latency data, jitter data, error rate data, and/or location data. The bandwidth data can indicate a maximum rate at which information can be transferred. In some instances, the bandwidth data can indicate a data rate such as bits per second (bps). In some instances, the bandwidth data can indicate a measured data rate (e.g., instantaneously measured and/or based on mapped data, as discussed herein). For example, the vehicle 202 can transmit a steady stream of data where the maximum bandwidth indicates a data rate of 100 Mbps. However, the vehicle 202 can determine that the measured data rate is 50 Mbps. Therefore, the bandwidth data can indicate a maximum data rate of 100 Mbps and measured data rate of 50 Mbps. In some instances, the measured data rate can be referred to as the throughput.

The signal strength data can indicate the strength of the signal associated with the network. For example, the signal strength of the network can be measured in decibels-milliwatts, arbitrary strength units, reference signals received power (RSRP), and/or reference signals received quality (RSRQ).

The frequency band data can indicate a radio frequency (also referred to as a frequency, band, and/or spectrum) associated with a network signal and/or a network.

Time data can indicate a time of day associated with the measurement of the network parameters.

Latency data can indicate a delay in the network. For example, the latency can indicate the amount of time between the vehicle 202 transmitting vehicle data and a remote computing device receiving the vehicle data.

Jitter data can indicate a variation in the latency in the network.

Error rate data can indicate a rate and/or percentage of data that is lost, dropped, incorrect, or corrupted compared to the data that is transmitted and received correctly.

In some instances, the vehicle 202 can estimate a portion of the first network parameters 206 prior to transmitting the vehicle data. For example, the vehicle 202 can transmit a data packet with a small or empty payload and transmit a data packet with a large payload to a remote computing device. The remote computing device can acknowledge receipt of the data packets by responding with an acknowledgement packet. The vehicle 202 can determine a roundtrip time (also referred to as a response time) associated with the data packet and estimate the bandwidth by dividing the size of the data packet with the large payload by the difference in the roundtrip times of the two data packets. The vehicle 202 can use the estimated network parameters to determine how much vehicle data that it can transmit prior to transmitting the vehicle data. In some instances, the vehicle 202 can be configured to continually execute network parameter estimation algorithms and/or tests as it traverses the trajectory 204. In some examples, such estimation techniques can be initiated by a remote computing device and received by the vehicle 202. For example, a remote computing device can determine a roundtrip time as discussed above and can send the time difference value to the vehicle 202 as a payload of an acknowledgement message.

In any of the above examples, the premeasured data from the network map data (bandwidth, latency, error rate, etc.) can be used to preemptively determine which data topics (e.g., types/amounts of vehicle data) to transmit over which networks whereas the measured (or instantaneous) data, such as described above, may be used to further modify the topics, amounts of data, or the like transmitted over the multiple networks.

The network map data can associate network parameters at other locations different from the current location. For example, the network map data can indicate that at location ②, the first network has first network parameters 208. In some instances, the vehicle 202 can determine predicted network parameters (also referred to as predicted network data) using the measured and/or estimated network parameters associated with the first network at a first location and the network map data associated with the first network at a second location. For example, the vehicle can use the first network parameters 206 to predict network parameters for the first network at location ②. The vehicle can use prediction algorithms such as Kalman filtering, extended Kalman filtering, and/or weighted averaging to determine the predicted network parameters, although other types of algorithms are contemplated. In some instances, the vehicle 202 can use machine-learning algorithms to determine and/or refine the predicted network.

For purposes of illustration only, the vehicle 202 can determine that the measured available bandwidth for the first network at location ① is 100 Mbps and that the mapped available bandwidth for the first network at location ① is 200 Mbps (i.e., available bandwidth is 50% of what is expected based on the network map data). Additionally, the vehicle 202 can access network map data indicating that the mapped available bandwidth for the first network at location ② is 150 Mbps. Using the network map data and the measured network data, the vehicle 202 can determine a predicted available bandwidth for the first network associated with location ② as 75 megabits.

In some instances, the vehicle 202 can determine a network confidence level associated with the network map data and/or the predicted network parameters. For example, the vehicle 202 can determine a variance between the measured network parameters associated with a current location and the network map data associated with the current location. Based on the variance meeting or exceeding a variance threshold, the vehicle 202 can determine a network confidence level associated with the network map data associated with a different location and/or the predicted network parameters associated with the different location.

As discussed above, the network map data can include event data associating the network parameters with an event. In some instances, the vehicle 202 can determine the predicted network parameters based on current or upcoming events. For purposes of illustration only, the network map data can indicate a drop of 50% in available bandwidth when a sporting event occurs at a particular location. The vehicle 202 can determine that a sporting event has begun or will begin at the particular location and determine a predicted available bandwidth based on the sporting event that has begun or will begin.

The network map data can also indicate the second network parameters 210 associated with location ②. For example, the first network parameters 208 can be associated with a first network and the second network parameters 210 can be associated with a second network, where the second network provides network coverage within a second network region 211. Therefore, for purposes of illustration only, location ① can be serviced by the first network as depicted via first network region 207 and location ② can be serviced by the first network and the second network as depicted by first network region 207 and second network region 211.

At operation 212, the vehicle 202 can determine vehicle data for transmission based on the first network parameters 208 and the second network parameters 210. For example, the vehicle 202, using the network map data and/or the measured network parameters to determine the vehicle data for transmission based on the first network parameters 206. As depicted, the second network may not provide network availability or the second network may not provide network availability that meets or exceeds a network availability threshold and, therefore, determine the vehicle data where the second network parameters could represent a null value. In some instances, the vehicle 202, can preemptively prepare the vehicle data for transmission. For example, the vehicle 202, using the trajectory 204 and the network map data, can determine that it will enter location ② shortly. The vehicle 202 can recognize the network parameters associated with location ② and, accordingly, can determine the vehicle data for transmission based on the first network parameters 208 and the second network parameters 210.

For example, the first network parameters 208 can indicate that the first network can provide 100 Mbps at location ② and the second network parameters 210 can indicate that the second network can provide 10 Mbps at location ②. Then, vehicle 202 can prioritize the vehicle data. For example, the vehicle 202 can determine that the vehicle data comprising the vehicle's pose data and diagnostic data have a higher priority than the image data, and can associate the pose data and the diagnostic data with a first transmission queue associated with the first network and place the image data in a later position in the first transmission queue. For purposes of illustration only, the vehicle 202 can utilize the available bandwidth from the first network prior to attempting to transmit data over the second network. In some instances, the vehicle can also place the image data in the second transmission queue associated with the second network. This can allow the vehicle 202 to attempt to transmit the higher priority data over the network with the faster network connection while attempting to transmit the lower priority data over the network with the slower network connection. In some instances, the vehicle can determine a threshold bandwidth (or a threshold associated with a different network parameter) associated with the first network and transmit the lower priority data over the network with the slower network connection when the threshold bandwidth is met or exceeded.

In some instances, the vehicle 202 can send the same data via the first network and the second network. If a remote computing device receives the same data, it can be configured to de-duplicate the data. In some instances, the vehicle 202 can provide an indication that the data being transmitted is or might be duplicated data. Duplication of data may be used in regions of high variability of network connectivity to ensure the highest priority items are received.

In some instances, the vehicle 202 can determine and/or select the vehicle data based on the network parameters. For example, at operation 212, the vehicle 202 can compress, crop, or otherwise reduce an amount of image data in to be transmitted over the available bandwidth. In some instances, the vehicle 202 can send a subset of the image data in order to reduce a size of the image data. For example, the vehicle 202 can select image data from a first image sensor of the vehicle 202 and disregard image data from a second image sensor of the vehicle 202. In some instances, the vehicle 202 can determine a region of interest in the image data and compress portions of the image data not associated with the region of interest. In some instances, the vehicle 202 can reduce the transmission frequency by reducing the number of times per second or per minute that the vehicle 202 transmits the vehicle data to the remote computing device. In some instances, the vehicle can determine a transmission frequency based on a speed of the vehicle. For purposes of illustration only, the vehicle 202 can transmit vehicle data less frequently when standing still and increase the transmission frequency as the vehicle 202 accelerates.

Based on the vehicle data transmitted to the remote computing device by the vehicle 202, the vehicle 202 can determine a set of utilities and/or commands that are valid to be used and/or issued by a teleoperator associated with the remote computing device. In some instances, the remote computing device can request additional vehicle data. As discussed above, the remote computing device may require the additional vehicle data to provide guidance to the vehicle 202.

In some examples, as the vehicle 202 determines (e.g., measures) network parameters as the vehicle 202 traverses an environment, such network parameters can be incorporated into the network map data to continuously update the mapped data.

FIG. 2B illustrates an example environment 214 which can be similar to the example environment 200 described above with reference to FIG. 2A where the vehicle 202 has advanced in its trajectory 204 to location ②. Similar to location ①, the vehicle 202 at location ② can determine the first network parameters 216, associated with a first network, that includes, for example, the mapped network parameters as well as the measured network parameters where the measured network parameters are measured by the vehicle 202. Additionally, and similarly, the vehicle 202 can determine second network parameters 218 that are associated with a second network.

In some instances, and using similar techniques as described above with reference to locations ① and ②, the vehicle 202 can determine the second network parameters 220 associated with location ③ to determine the second network parameters 220. For location ④, the network map data can indicate no network connectivity 222 and that neither the first network nor the second network provide network availability at location ④. For location ⑤, the vehicle can perform similar determinations and determine first network parameters 224. Therefore, first network region 225 can provide network coverage associated with the first network where the first network provides coverage at first network region 207 and at the first network region 225.

In some instances, the vehicle 202 can update the predicted network parameters at a different location based on the measured network parameters at the vehicle's current location and/or based on network map data associated with the current location or at different locations. For example, the vehicle 202 can update the predicted network parameters for the second network parameters 220 at location ③ based on the measured network parameters for the second network parameters 218 at location ②. Therefore, as the vehicle 202 progresses through the environment 214, the vehicle can continuously adjust and/or refine the predicted network parameters at other locations.

At operation 226, the vehicle 202 can configure the vehicle data for transmission based on the first network parameters and the second network parameters 220. As discussed above, the vehicle 202 can prepare the vehicle data for transmission using the network map data and/or the measured network parameters at a current location of the vehicle and/or a future location of the vehicle. As discussed above, the vehicle 202 can configure the vehicle data by compressing the vehicle data, prioritizing portions of the vehicle data, identifying regions of interest in the vehicle data, and/or disregarding portions of the vehicle data.

Further, as the vehicle 202 approaches location ③ while traversing the trajectory 204, the vehicle 202 can configure the vehicle data based on recognizing that it will not have network connectivity at location ④. For example, the vehicle 202 can configure the vehicle data such that all or a significant portion of the vehicle data that is above a particular priority level will be transmitted prior to approaching a threshold distance associated with location ④.

Additionally, the vehicle 202 can configure the vehicle data as it traverses through a location without network connectivity such as location ④. For example, as the vehicle 202 traverses through location ④, it can continue to calculate and/or determine vehicle data. As discussed above, the vehicle 202 can determine a priority level associated with portions of the vehicle data and associate portions of the vehicle data with one or more transmission queues associated with one or more networks. In some instances, the vehicle 202 can determine that a portion of the vehicle data in a transmission queue is no longer valid. Then, the vehicle 202 can delete, discard, or otherwise remove portions of the vehicle data in the transmission queue and can optimize the data transmitted once the vehicle 202 enters a location that provides network connectivity.

FIG. 2C illustrates an example environment 228 which can be similar to the example environment 214 described above with reference to FIG. 2B. At operation 230, the vehicle 202 can determine a new trajectory 232 based on determining that location ④ does not provide network connectivity. For example, the vehicle 202 can determine that it requires network connectivity through a particular portion of the trajectory and determine the new trajectory 232. The new trajectory 232 can be based at least in part on the second network parameters 234. For example, the vehicle 202 can access network map data indicating network parameters for the second network at the location ⑥ (e.g., that the second network provides connectivity at location ⑥ as depicted as falling within second network region 211). Then, the vehicle 202 can determine the new trajectory 232 such that it traverses through location ⑥ (instead of through location ④) and is able to pick up the original trajectory 204 at location ⑤, for example. In some instances, the new trajectory 232 can continue without returning to the initial trajectory 204. In some instances, the vehicle 202 can request additional network map data based on recognizing that a location along the original trajectory does not have network connectivity. In some instances, the vehicle 202 can access the network map data already stored in the vehicle to determine the new trajectory 232.

Figure 3:
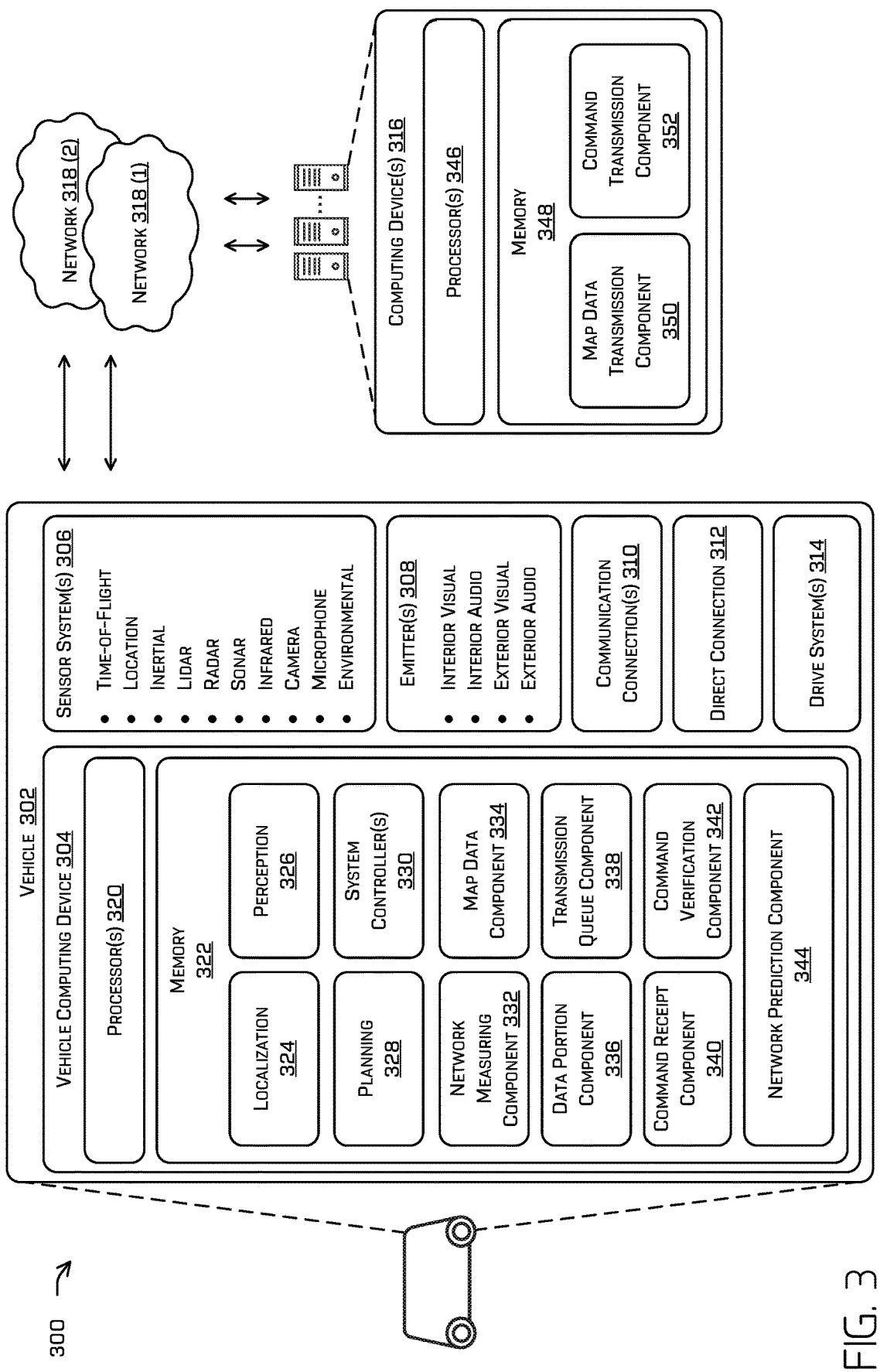
FIG. 3 depicts a block diagram of an example system for implementing the techniques described herein.

FIG. 3 depicts a block diagram of an example system 300 for implementing the techniques discussed herein. In at least one example, the system 300 can include a vehicle 302, which can be similar to the vehicle 102 described above with reference to FIG. 1 and vehicle 202 described above with reference to FIGS. 2A-2C. In the illustrated example 300, the vehicle 302 is an autonomous vehicle; however, the vehicle 302 can be any other type of vehicle.

The vehicle 302 can include a vehicle computing device 304, one or more sensor systems 306, one or more emitters 308, one or more communication connections 310 (also referred to as communication devices and/or modems), at least one direct connection 312 (e.g., for physically coupling with the vehicle 302 to exchange data and/or to provide power), and one or more drive systems 314. The one or more sensor systems 306 can be configured to capture sensor data associated with an environment.

The sensor system(s) 306 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 306 can include multiple instances of each of these or other types of sensors. For instance, the time-of-flight sensors can include individual time-of-flight sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device 304.

The vehicle 302 can also include one or more emitters 308 for emitting light and/or sound, as described above. The emitters 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 302 can also include one or more communication connection(s) 310 that enable communication between the vehicle 302 and one or more other local or remote computing device(s) (e.g., a remote teleoperations computing device) or remote services. For instance, the communication connection(s) 310 can facilitate communication with other local computing device(s) on the vehicle 302 and/or the drive system(s) 314. Also, the communication connection(s) 310 can allow the vehicle 302 to communicate with other nearby computing device(s) (e.g., other nearby vehicles, traffic signals, etc.).

The communications connection(s) 310 can include physical and/or logical interfaces for connecting the vehicle computing device 304 to another computing device or one or more external networks 318(1) and/or 318(2) (e.g., the Internet). For example, the communications connection(s) 310 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 310 may comprise the one or more modems as described in detail above.

In at least one example, the vehicle 302 can include one or more drive systems 314. In some examples, the vehicle 302 can have a single drive system 314. In at least one example, if the vehicle 302 has multiple drive systems 314, individual drive systems 314 can be positioned on opposite ends of the vehicle 302 (e.g., the front and the rear, etc.). In at least one example, the drive system(s) 314 can include one or more sensor systems to detect conditions of the drive system(s) 314 and/or the surroundings of the vehicle 302. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 314. In some cases, the sensor system(s) on the drive system(s) 314 can overlap or supplement corresponding systems of the vehicle 302 (e.g., sensor system(s) 306).

The drive system(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive system controller which can receive and preprocess data from the sensor system(s) and to control operation of the various vehicle systems. In some examples, the drive system controller can include one or more processors and memory communicatively coupled with the one or more processors. The memory can store one or more modules to perform various functionalities of the drive system(s) 314. Furthermore, the drive system(s) 314 also include one or more communication connection(s) that enable communication by the respective drive system with one or more other local or remote computing device(s).

The vehicle computing device 304 can be similar to the vehicle computing device 104 describe above with reference to FIG. 1. The vehicle computing device 304 can include one or more processors 320 and memory 322 communicatively coupled with the one or more processors 320. In at least one instance, the one or more processors 320 can be similar to the processor(s) 106 and the memory 322 can be similar to the memory 108 described above with reference to FIG. 1. In the illustrated example, the memory 322 of the vehicle computing device 304 stores a localization component 324, a perception component 326, a planning component 328, one or more system controllers 330, a network measuring component 332, a map data component 334, a data portion component 336, a transmission queue component 338, a command receipt component 340, a command verification component 342, and a network prediction component 344. Though depicted as residing in the memory 322 for illustrative purposes, it is contemplated that the localization component 324, the perception component 326, the planning component 328, one or more system controllers 330, the network measuring component 332, the map data component 334, the data portion component 336, the transmission queue component 338, the command receipt component 340, the command verification component 342, and the network prediction component 344 can additionally, or alternatively, be accessible to the vehicle computing device 304 (e.g., stored in a different component of vehicle 302 and/or be accessible to the vehicle 302 (e.g., stored remotely).

The remote computing device 316 can include one or more processors and memory 348 communicatively coupled with the one or more processors 346. In at least one instance, the one or more processors 346 can be similar to the processor(s) 106 and the memory 348 can be similar to the memory 108 described above with reference to FIG. 1. In the illustrated example, the memory 348 of the computing device 316 stores a map data transmission component 350 and a command transmission component 352.

In memory 322 of the vehicle computing device 304, the localization component 324 can include functionality to receive data from the sensor system(s) 306 to determine a position of the vehicle 302. For example, the localization component 324 can include and/or request/receive a three-dimensional map of an environment and can continuously determine a location of the autonomous vehicle within the map. In some instances, the localization component 324 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 324 can provide data to various components of the vehicle 302 to determine an initial position of an autonomous vehicle for generating a trajectory, as discussed herein.

The perception component 326 can include functionality to perform object detection, segmentation, and/or classification. In some examples, the perception component 326 can provide processed sensor data that indicates a presence of an entity that is proximate to the vehicle 302 and/or a classification of the entity as an entity type (e.g., car, pedestrian, cyclist, building, tree, road surface, curb, sidewalk, unknown, etc.). In additional and/or alternative examples, the perception component 326 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The planning component 328 can determine a path for the vehicle 302 to follow to traverse through an environment. For example, the planning component 328 can determine various routes and paths and various levels of detail. In some instances, the planning component 328 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 328 can generate an instruction for guiding the autonomous vehicle along at least a portion of the route from the first location to the second location. In at least one example, the planning component 328 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 328 can alternatively, or additionally, use data from the perception component 326 to determine a path for the vehicle 302 to follow to traverse through an environment. For example, the planning component 328 can receive data from the perception component 326 regarding objects associated with an environment. Using this data, the planning component 328 can determine a route to travel from a first location (e.g., a current location) to a second location (e.g., a target location) to avoid objects in an environment. In at least some examples, such a planning component 328 may determine there is no such collision free path and, in turn, provide a path which brings vehicle 302 to a safe stop avoiding all collisions and/or otherwise mitigating damage.

In at least one example, the vehicle computing device 304 can include one or more system controllers 330, which can be configured to control steering, propulsion, braking, safety, emitters, communication, and other systems of the vehicle 302. These system controller(s) 330 can communicate with and/or control corresponding systems of the drive system(s) 314 and/or other components of the vehicle 302, which may be configured to operate in accordance with a path provided from the planning component 328.

The network measuring component 332 can determine network parameters at a current location of the vehicle 302. For example, as the vehicle 302 traverses through an environment, the vehicle can determine network parameters using, in some instances, the communication connections 310. As discussed above, the network parameters can include bandwidth data, signal strength data, frequency band data, latency data, jitter data, error rate data, time data, and/or event data. In some instances, a communication connection 310 can connect to a first network and the network measuring component 332 can determine network parameters associated with the first network. In some instances, the communication connection 310 can also connect to a second network and the network measuring component 332 can determine network parameters associated with the second network. In some instances, the vehicle 302 can have multiple communication connections 310 and use a first communication connection to determine network parameters associated with a first network and a second communication connection to determine network parameters associated with a second network.

The map data component 334 can access network map data associated with an environment. For example, the map data component 334 can be loaded with the network map data prior to operating the vehicle 302 in an environment. In some examples, the network map data may be data associated with the map described above with respect to the localization component 324. In some instances, the network map data can represent location and/or condition based network parameters such as bandwidth data, signal strength data, frequency band data, latency data, jitter data, error rate data. For example, condition data can include time data, weather data, event data, and the like. In some instances, the map data component 334 can request the network map data from a remote computing device 316. For example, the map data transmission component 350 of the computing device 316 can respond to the request and transmit the network map data to the map data component 334. Then the map data component 334 can store the network map data in the map data component 334. In some instances, the map data component 334 can request network map updates from the map data transmission component 350 to update the network map data stored in the map data component 334.

In some instances, the map data component 334 can be configured to update the network map data stored in the computing device 316 at the map data transmission component 350. For example, the network measuring component 332 can determine network parameters associated with a first network 318(1). Then, the map data component 334 can use the network parameters to determine a network map update which can be transmitted to the computing device 316 allowing other vehicles to obtain the updated network map data. In some instances, the map data component 334 may provide measured network parameters directly to computing device 316 such that the computing device 316 may update locally stored maps based on, for example, Bayesian filtering, weighted averages, or the like. In some instances, the map data component 334 can determine that a portion of the trajectory passes through areas without network connectivity and instruct the planning component 328 to determine a new trajectory for the vehicle to follow based on the network map data.

The data portion component 336 can determine and/or configure the vehicle data for transmission. For example, the vehicle 302 can determine vehicle data by capturing sensor data using sensor system(s) 306. Additionally, in some instances, the vehicle 302 can determine vehicle data as including vehicle status data, vehicle diagnostic data, and/or vehicle metrics. In some examples, various components (including sensor systems(s) 306) may transmit information between one another as one or more messages, and, in some instances, may comprise (or otherwise be referred to as having) associated message topics. Based on the network parameters determined by the network measuring component 332, the data portion component 336 can determine portions of the vehicle data (e.g., subsets of the one or more messages) as well as a priority level associated with various portions of the vehicle data. By way of example, and without limitation, the data portion component 336 can determine that the vehicle diagnostic data and the vehicle status data has a higher priority level than the network map update data determined by the network measuring component 332. Then the data portion component 336 can associate the portions of data with a network and/or with a priority level. In some examples, priority levels may be assigned based on context (e.g., what the vehicle is doing, needs to do, location, maneuver being performed, etc.) and/or topic.

In some examples, the data portion component 336 can determine data to be sent to a remote computing device based at least in part on a request from the remote computing device. For example, a remote computing device can request pose data associated with the vehicle 302 and/or bounding box(es) determined by the perception component 326 representing one or more objects in an environment proximate to the vehicle. Accordingly, the data portion component 336 can prioritize data accordingly and transmit the data to the remote computing device, as discussed herein.

The transmission queue component 338 can place portions of the vehicle data into an appropriate queue. The communication connection(s) 310 (also referred to as communication devices and/or modems) can include a transmission queue similar to the transmission queue 116 and the transmission queue 118 as discussed with reference to FIG. 1. The transmission queue component 338 can access the data portions determined by the data portion component 336 and, based on the network and/or priority level associated with the data portions), associate the data portions with the appropriate transmission queue. For example, the transmission queue component 338 can access a first portion of the vehicle data that has a higher priority level than a second portion of the vehicle data. Then, the transmission queue component 338 can use the network parameters measured by the network measuring component 332 to determine that a first transmission queue is associated with a first network 318(1) that has more network availability than a second transmission queue that is associated with a second network 318(2). Then, the transmission queue component 338 can associate the first portion of the vehicle data with the first transmission queue.

In some instances, the transmission queue component 338 can broadcast the portions of vehicle data and place the portions of vehicle data into both transmission queues. In some instances, the transmission queue component can determine that a portion of the vehicle data in a transmission queue is stale or no longer relevant and remove the stale portion of vehicle data from the transmission queue.

The command receipt component 340 can receive a command from the command transmission component 352 of the computing device 316. For example, the vehicle 302 can transmit the vehicle data to the computing device 316. As discussed above, the vehicle 302 can also send a request to a teleoperations device to obtain guidance to resolve uncertainty. The transmission queue component 338 can queue up portions of the vehicle data and cause it to be transmitted by the communication connections 310 via the networks 318 to the command transmission component 352. The command transmission component can receive a command from a teleoperator and/or determine a command to be transmitted and sent to the command receipt component 340.

The command verification component 342 can verify the command received at the command receipt component 340. For example, the vehicle 302 can determine that the vehicle data transmitted to the computing device 316 can allow for a particular set of guidance to be received from the computing device 316 and/or the teleoperator. After receiving the command at the command receipt component 340, the command verification component 342 can determine if the received command falls within the set of guidance that is associated with the vehicle data transmitted to the computing device 316. In some instances, the command verification component 342 can ignore the received command. In some instances, the command verification component 342 can request an updated command. In some instances, the vehicle 302 can determine a set of utilities and/or user interfaces associated with the transmitted vehicle data such that the computing device 316 and/or the teleoperator must select a command from a limited set of commands.

The network prediction component 344 can use the measured network parameters and the network map data to predict network parameters at a different location. As discussed above, the network prediction component 344 can use prediction algorithms such as Kalman filtering, extended Kalman filtering, and/or weighted averages to determine the predicted network parameters. In some instances, the data portion component can use the predicted network parameters determined by the network prediction component 344 to determine portions of the vehicle data and/or assign priority levels to the portions of the vehicle data. Similar to the network measuring component 332, the network prediction component 344 can determine that portions of the trajectory do not provide the necessary network parameters to operate according to the operating procedures of the current trajectory and/or objective. The network prediction component 344 can instruct the planning component 328 to determine a new trajectory based on the predicted network parameters.

The processor(s) 320 of the vehicle 302, the processor(s) 346 of the computing device 316, and the processor(s) 106 of the vehicle computing device 104 of FIG. 1 can be any suitable processor capable of executing instructions to process data and perform operations as described herein. By way of example and not limitation, the processor(s) 320, 346, and 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 322 of the vehicle 302, the memory 348 of the computing device 316, and the memory 108 of the vehicle computing device 104 of FIG. 1 are examples of non-transitory computer-readable media. The memory 322, 348, and 108 can store an operating system and one or more software applications, instructions, programs, and/or data to implement the methods described herein and the functions attributed to the various systems. In various implementations, the memory 322, 348, and 108 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 322, 348, and 108 can be implemented as a neural network.

Figure 4:
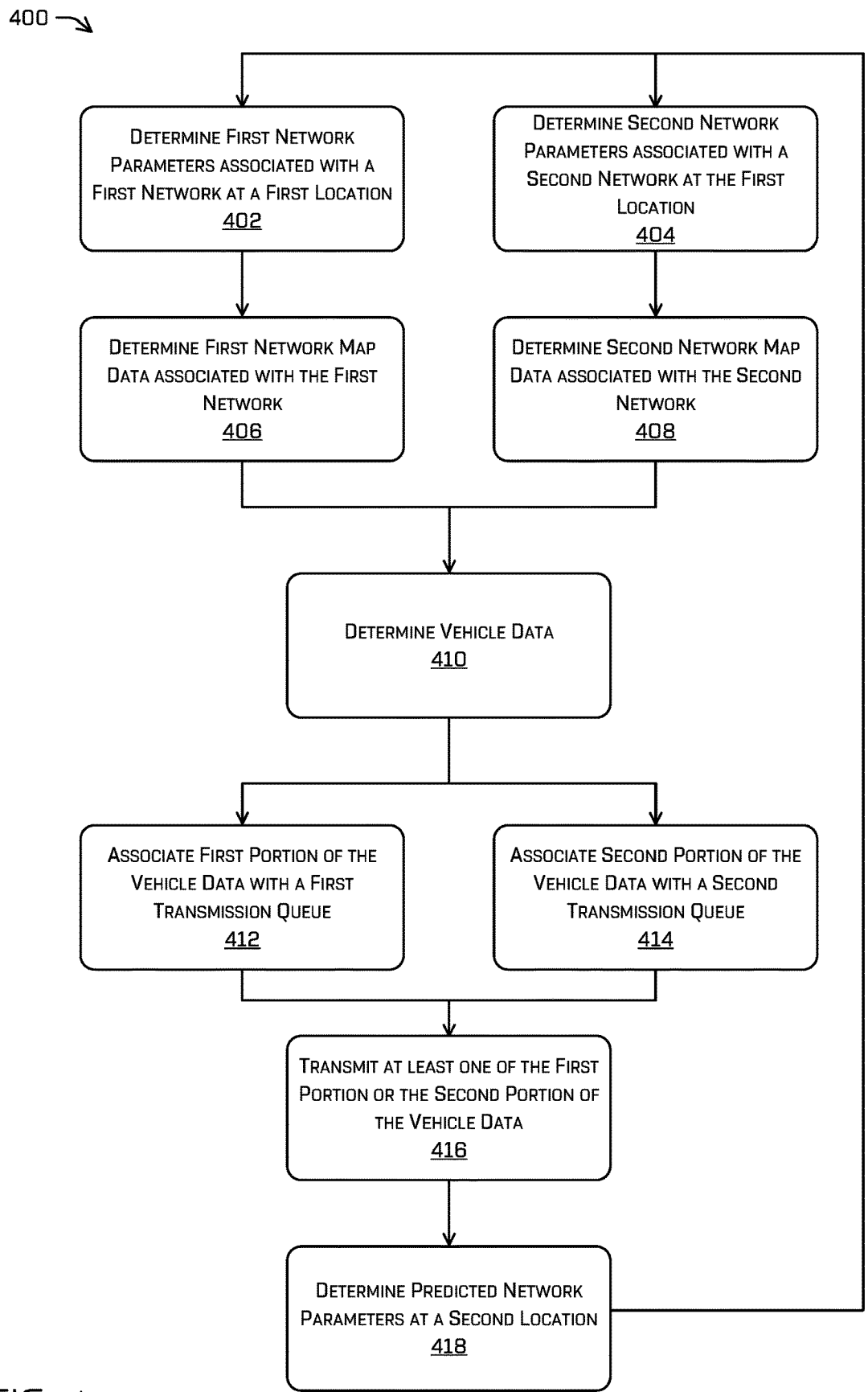
FIG. 4 depicts a flow diagram representative of one or more processes for an adaptive multi-network vehicle architecture as described herein.

FIG. 4 depicts an example process 400 for determining predicted network parameters at a second location. In some instances, some or all of process 400 can be performed by one or more components in FIG. 1 or 3, as described herein. The process 400 is described with reference to the vehicle 102 in FIG. 1 and/or the vehicle 302 in FIG. 3. Additionally, some portions of process 400 can be omitted, replaced, and/or reordered while still providing the functionality of determining whether a computing device should remain in a standby state.

At operation 402, the network measuring component 332 can determine the first network parameters associated with a first network at a first location. As discussed above, in some instances, the network measuring component 332 can determine estimated network parameters (e.g., bandwidth) by transmitting a data packet with a small payload and a data packet with a large payload. In some examples, the network measuring component 332 can determine a latency associated with a network at a location by measuring the round trip time (RTT). In some examples, the network measuring component 332 can determine a signal strength by querying a protocol such as SNMP.

At operation 404, the network measuring component 332 can similarly determine the second network parameters associated with a second network at the first location. In some instances, the first network and the second network can be associated with the same network provider and/or operation. In some instances, the first network and the second network can be associated with different network providers and/or operators.

At operation 406, the map data component 334 can determine first network map data associated with the first network. As discussed above, the map data component 334 can be loaded with the network map data prior to operating the vehicle in an environment. In some instances, the map data component 334 can request network map data from a remote computing device and receive the network map data from a map data transmission component 350.

At operation 408, the map data component 334 can similarly determine second network map data associated with the second network.

At operation 410, the vehicle 302 can determine vehicle data. For example, the vehicle 302 can use one or more sensor systems 306 to capture sensor data of an environment as the vehicle data. In some instances, the vehicle 302 can calculate a trajectory as the vehicle data. In some instances, the vehicle can determine portions of the vehicle data as vehicle status, vehicle position data, and/or vehicle diagnostic data. In any example, vehicle data may comprise one or more messages determined by any one or more components of the vehicle 302 and/or associated message topics. Then the data portion component 336 can use the measured network parameters and/or the network map data to determine portions of the vehicle data and/or associate a priority level with the portions of vehicle data.

At operation 412, the transmission queue component 338 can associate a first portion of the vehicle data with a first transmission queue. Similarly, at operation 414, the transmission queue component 338 can associate a second portion of the vehicle data with a second transmission queue. As discussed above, the first transmission queue can be associated with a first network and the second transmission queue can be associated with a second network. In some instances, the first transmission queue can be a higher priority queue and the second transmission queue can be a lower priority queue regardless of network association.

At operation 416, the one or more communication connections 310 can transmit at least one of the first portion or the second portion of the vehicle data. As discussed above, the one or more communication connections 310 can be one or more modems that are associated with one or more networks 318(1) and 318(2).

At operation 418, the network prediction component 344 can predict network parameters at a different location from the current location of the vehicle 302. As discussed above, the network prediction component 344 can use the measured network parameters and the network map data to predict network parameters at a different location using, for example, a Kalman filtering algorithm, an extended Kalman filtering algorithm, and/or weighted averages, although other algorithms are contemplated.

Accordingly, the techniques discussed herein provide a robust implementation of an adaptive multi-network vehicle architecture to allow a vehicle to maintain and/or optimize network availability and to continue operating in a safe manner.

EXAMPLE CLAUSES

A: A system of an autonomous vehicle, the system comprising: a first modem; a second modem; a sensor; a processor; and a computer-readable medium storing computer-executable instructions that, when executed, cause the system to perform operations comprising: determining first network parameters associated with a first wireless network; determining second network parameters associated with a second wireless network; capturing, using the sensor, sensor data of an environment, at least a first portion of the sensor data associated with a first priority; determining, based at least in part on the sensor data, vehicle data, at least a second portion of the vehicle data associated with a second priority; determining, based at least in part on the first network parameters, the second network parameters, the first priority and the second priority, the first portion of the sensor data to transmit via the first modem; determining, based at least in part on the first network parameters, the second network parameters, the first priority and the second priority, the second portion of the vehicle data to transmit via the second modem; transmitting, via the first modem and to a remote computing device, the first portion of the sensor data; transmitting, via the second mode and to the remote computing device, the second portion of the vehicle data; receiving, via at least one of the first modem or the second modem, a command from the remote computing device; and controlling the autonomous vehicle based at least in part on the command.

B: The system of paragraph A, wherein: the first wireless network is associated with a first network provider and the second wireless network is associated with a second network provider that is different from the first network provider; the operations further comprise: accessing first network map data associated with the first wireless network in the environment; accessing second network map data associated with the second wireless network in the environment; determining, with the first modem, first measured network parameters; and determining, with the second modem, second measured network parameters; determining the first network parameters is based at least in part on one or more of the first network map data or first measured network data, and determining the second network parameters is based at least in part on one or more of the second network map data or second measured network data.

C: The system of paragraph B, wherein the first network map data comprises signal parameters associated with a location, the signal parameters comprising one or more of a maximum bandwidth, a signal strength, or a latency.

D: The system of paragraph C, wherein determining the first portion of the sensor data is further based at least in part on a trajectory of the autonomous vehicle, wherein the location is associated with the trajectory.

E: The system of any of paragraphs A-D, wherein: the first portion of the sensor data comprises image data; and the vehicle data further comprises at least one of a bounding box associated with an object represented in the image data, a pose of the autonomous vehicle, a trajectory of the autonomous vehicle, or diagnostic data associated with the autonomous vehicle.

F: A method comprising: determining first network parameters associated with a first wireless network; determining second network parameters associated with a second wireless network; determining data associated with a vehicle, a first portion of the data associated with a first priority and a second portion of the data associated with a second priority; associating, based at least in part on the first network parameters, the second network parameters, and the first priority, the first portion of the data with a first transmission queue, the first transmission queue associated with the first wireless network; and associating, based at least in part on the first network parameters, the second network parameters, and the second priority, the second portion of the data with a second transmission queue, the second transmission queue associated with the second wireless network.

G: The method of paragraph F, wherein the first network parameters comprise at least one of: bandwidth data; signal strength data; frequency band data; time data associated with the first network parameters; latency data; jitter data; error rate data; or location data.

H: The method of paragraph F or G, wherein the data comprises at least one of a pose of the vehicle, a bounding box associated with an object of an environment, a trajectory of the vehicle, diagnostic data, or sensor data captured by a sensor of the vehicle.

I: The method of any of paragraphs F-H, the method further comprising: determining, with a modem associated with the first wireless network, first measured parameters; wherein determining the first network parameters is based at least in part on one or more of first network map data or the first measured parameters, the method further comprising: transmitting, via the modem to a data store associated with the first network map data, the first measured parameters, the first measured parameters representing at least one of a first signal strength or a first bandwidth.

J: The method of paragraph I, wherein determining the first network map data comprises: selecting, based at least in part on a parameter index, the first network map data from a plurality of network maps, wherein the parameter index comprises at least one of a time parameter, an event parameter, or a weather parameter.

K: The method of paragraph I or J, wherein the vehicle is at a first location, the method further comprising: determining, based at least in part on the first network map data and the first measured parameters, predicted network data at a second location; and controlling, based at least in part on the predicted network data, the vehicle; wherein determining the predicted network data comprises one or more of a Kalman filter, an extended Kalman filter, or a weighted average.

L: The method of any of paragraphs I-K, wherein determining the first measured parameters comprises: transmitting, via the modem, a first data packet; determining a first response time associated with the first data packet; transmitting, via the modem, a second data packet that is larger than the first data packet; determining a second response time associated with the second data packet; and determining, based at least in part on the first response time and the second response time, an estimated bandwidth associated with the first wireless network.

M: The method of any of paragraphs F-L further comprising: transmitting, via a modem and to a remote computing device, at least one of the first portion of the data or the second portion of the data; receiving, via the modem and from the remote computing device, a command; and controlling the vehicle based at least in part on the command.

N: The method of any of paragraphs F-M, wherein associating the second portion of the data with the second transmission queue is further based at least in part on a threshold bandwidth associated with the first wireless network, wherein associating the first portion of the data meets or exceeds the threshold bandwidth.

O: A non-transitory computer-readable medium storing instructions executable by a processor, wherein the instructions, when executed, cause the processor to perform operations comprising: determining first network parameters associated with a first network; determining second network parameters associated with a second network; determining data associated with a device, a first portion of the data associated with a first priority and a second portion of the data associated with a second priority; associating, based at least in part on the first network parameters, the second network parameters, the first priority, and the second priority, the first portion of the data with a first transmission queue that is associated with the first network; and associating, based at least in part on the first network parameters, the second network parameters, the first priority, and the second priority, the second portion of the data with a second transmission queue that is associated with at least one of the first network or the second network.

P: The non-transitory computer-readable medium of paragraph O, the operations further comprising: receiving first network map data; receiving second network map data; determining, with a first modem, first measured parameters; and determining, with a second modem, second measured parameters; wherein: determining first network parameters is based at least in part on one or more of the first network map data or the first measured parameters; and determining second network parameters is based at least in part on one or more of the second network map data or the second measured parameters.

Q: The non-transitory computer-readable medium of paragraph P, the operations further comprising: using a prediction algorithm, determining, based at least in part on the first network parameters and the first network map data, predicted network parameters; wherein the prediction algorithm comprises at least one of: a weighted average algorithm; or a Kalman filter algorithm.

R: The non-transitory computer-readable medium of any of paragraphs O-Q, wherein determining the data is based at least in part on determining, using a sensor of the device, sensor data of an environment, wherein the data comprises the sensor data.

S: The non-transitory computer-readable medium of paragraph R, wherein the device is an autonomous vehicle, the operations further comprising: determining, based at least in part on the data, a trajectory for the autonomous vehicle; wherein associating the first portion of the data with the first transmission queue is further based at least in part on the trajectory.

T: The non-transitory computer-readable medium of paragraph S, the operations further comprising: transmitting, to a remote computing device, at least one of the first portion or the second portion of the data; determining, with a first modem, first measured parameters; and transmitting, to the remote computing device, the first measured parameters; receiving, from the remote computing device, a command; and controlling, based at least in part on the command, the autonomous vehicle.

While the example clauses described above are described with respect to one particular implementation, it should be understood that, in the context of this document, the content of the example clauses can also be implemented via a method, device, system, and/or computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system of an autonomous vehicle, the system comprising:
   a first modem;
   a second modem;
   a sensor;
   one or more processors; and
   one or more computer-readable media storing computer-executable instructions that, when executed, cause the system to perform operations comprising:
      determining first network parameters associated with a first wireless network;

determining second network parameters associated with a second wireless network;

capturing, using the sensor, sensor data of an environment, at least a first portion of the sensor data associated with a first priority, wherein the first portion of the sensor data comprises image data;

determining, based at least in part on the sensor data, vehicle data, at least a second portion of the vehicle data associated with a second priority, wherein the second portion of the vehicle data comprises an object represented in the image data;

determining, based at least in part on the first network parameters, the second network parameters, and the first priority, the first portion of the sensor data to transmit via the first modem associated with a first transmission queue, wherein the first transmission queue is a higher priority queue;

determining, based at least in part on the first network parameters, the second network parameters, and the second priority, the second portion of the vehicle data to transmit via the second modem associated with a second transmission queue, wherein the second transmission queue is a lower priority queue;

transmitting, via the first modem and the first transmission queue and to a remote computing device, the first portion of the sensor data;

transmitting, via the second modem and the second transmission queue and to the remote computing device, the second portion of the vehicle data;

receiving, via at least one of the first modem or the second modem, a command from the remote computing device; and controlling the autonomous vehicle based at least in part on the command.

2. The system of claim 1, wherein:
the first wireless network is associated with a first network provider and the second wireless network is associated with a second network provider that is different from the first network provider;
the operations further comprise:
    accessing first network map data associated with the first wireless network in the environment;
    accessing second network map data associated with the second wireless network in the environment;
    determining, with the first modem, first measured network parameters; and
    determining, with the second modem, second measured network parameters;
determining the first network parameters is based at least in part on one or more of the first network map data or the first measured network parameters, and
determining the second network parameters is based at least in part on one or more of the second network map data or the second measured network parameters.

3. The system of claim 2, wherein the first network map data comprises signal parameters associated with a location, the signal parameters comprising one or more of a maximum bandwidth, a signal strength, or a latency.

4. The system of claim 3, wherein determining the first portion of the sensor data is further based at least in part on a trajectory of the autonomous vehicle, wherein the location is associated with the trajectory.

5. The system of claim 1, wherein:
the vehicle data further comprises at least one of a bounding box associated with the object represented in the image data, a pose of the autonomous vehicle, a trajectory of the autonomous vehicle, or diagnostic data associated with the autonomous vehicle.

6. A method comprising:
determining first network parameters associated with a first wireless network;
determining second network parameters associated with a second wireless network;
determining data associated with a vehicle, a first portion of the data associated with a first priority and a second portion of the data associated with a second priority, wherein the first portion of the data comprises image data and the second portion of the data comprises an object represented in the image data;
associating, based at least in part on the first network parameters, the second network parameters, and the first priority, the first portion of the data with a first transmission queue, the first transmission queue associated with the first wireless network,
wherein the first transmission queue is a higher priority queue; and
associating, based at least in part on the first network parameters, the second network parameters, and the second priority, the second portion of the data with a second transmission queue, the second transmission queue associated with the second wireless network,
wherein the second transmission queue is a lower priority queue.

7. The method of claim 6, wherein the first network parameters comprise at least one of:
bandwidth data;
signal strength data;
frequency band data;
time data associated with the first network parameters;
latency data;
jitter data;
error rate data; or
location data.

8. The method of claim 6, wherein the data comprises at least one of a pose of the vehicle, a bounding box associated with the object represented in the image data, a trajectory of the vehicle, diagnostic data, or sensor data captured by a sensor of the vehicle.

9. The method of claim 6, the method further comprising:
determining, with a modem associated with the first wireless network, first measured parameters;
wherein determining the first network parameters is based at least in part on one or more of first network map data or the first measured parameters,
the method further comprising:
    transmitting, via the modem to a data store associated with the first network map data, the first measured parameters, the first measured parameters representing at least one of a first signal strength or a first bandwidth.

10. The method of claim 9, wherein determining the first network map data comprises:
selecting, based at least in part on a parameter index, the first network map data from a plurality of network maps, wherein the parameter index comprises at least one of a time parameter, an event parameter, or a weather parameter.

11. The method of claim 9, wherein the vehicle is at a first location,
the method further comprising:
    determining, based at least in part on the first network map data and the first measured parameters, predicted network data at a second location; and controlling, based at least in part on the predicted network data, the vehicle;
wherein determining the predicted network data comprises one or more of a Kalman filter, an extended Kalman filter, or a weighted average.

12. The method of claim 9, wherein determining the first measured parameters comprises:
transmitting, via the modem, a first data packet;
determining a first response time associated with the first data packet;
transmitting, via the modem, a second data packet that is larger than the first data packet;
determining a second response time associated with the second data packet; and
determining, based at least in part on the first response time and the second response time, an estimated bandwidth associated with the first wireless network.

13. The method of claim 6 further comprising:
transmitting, via a modem and to a remote computing device, at least one of the first portion of the data or the second portion of the data;
receiving, via the modem and from the remote computing device, a command; and
controlling the vehicle based at least in part on the command.

14. The method of claim 6, wherein associating the second portion of the data with the second transmission queue is further based at least in part on a threshold bandwidth associated with the first wireless network, wherein the first portion of the data meets or exceeds the threshold bandwidth.

15. One or more non-transitory computer-readable media storing instructions executable by one or more processors, wherein the instructions, when executed, cause the one or more processors to perform operations comprising:
determining first network parameters associated with a first network;
determining second network parameters associated with a second network;
determining data associated with a device, a first portion of the data associated with a first priority and a second portion of the data associated with a second priority, wherein the first portion of the data comprises image data and the second portion of the data comprises a bounding box associated with an object represented in the image data;
associating, based at least in part on the first network parameters, the second network parameters, the first priority, and the second priority, the first portion of the data with a first transmission queue that is associated with the first network,
wherein the first transmission queue is a higher priority queue; and
associating, based at least in part on the first network parameters, the second network parameters, the first priority, and the second priority, the second portion of the data with a second transmission queue that is associated with at least one of the first network or the second network,
wherein the second transmission queue is a lower priority queue.

16. The one or more non-transitory computer-readable media of claim 15, the operations further comprising:
receiving first network map data;
receiving second network map data;
determining, with a first modem, first measured parameters; and
determining, with a second modem, second measured parameters;
wherein:
determining the first network parameters is based at least in part on one or more of the first network map data or the first measured parameters; and
determining the second network parameters is based at least in part on one or more of the second network map data or the second measured parameters.

17. The one or more non-transitory computer-readable media of claim 16, the operations further comprising:
using a prediction algorithm, determining, based at least in part on the first network parameters and the first network map data, predicted network parameters;
wherein the prediction algorithm comprises at least one of:
a weighted average algorithm; or
a Kalman filter algorithm.

18. The one or more non-transitory computer-readable media of claim 15, wherein determining the data is based at least in part on determining, using a sensor of the device, sensor data of an environment, wherein the data comprises the sensor data.

19. The one or more non-transitory computer-readable media of claim 18, wherein the device is an autonomous vehicle, the operations further comprising:
determining, based at least in part on the data, a trajectory for the autonomous vehicle;
wherein associating the first portion of the data with the first transmission queue is further based at least in part on the trajectory.

20. The one or more non-transitory computer-readable media of claim 19, the operations further comprising:
transmitting, to a remote computing device, at least one of the first portion or the second portion of the data;
determining, with a first modem, first measured parameters; and
transmitting, to the remote computing device, the first measured parameters;
receiving, from the remote computing device, a command; and
controlling, based at least in part on the command, the autonomous vehicle.

* * * * *